2,831,008

MANUFACTURE OF SILICONE OILS

Herbert Knopf and Alexander Beerwald, Leverkusen-Bayerwerk, and Georg Brinkmann, Leverkusen, Germany, assignors to Farbenfabriken Bayer Aktiengesellschaft, Leverkusen, Germany, a corporation of Germany No Drawing. Application February 14, 1955
Serial No. 488,112

Claims priority, application Germany February 15, 1954

4 Claims. (Cl. 260—448.2)

In the hydrolysis of dimethyl-dichloro-silane or diethyl-dichloro-silane there are obtained oil-like siloxanes containing both poly-dialkyl-siloxane-diols and cyclic poly-dialkyl-siloxanes. These cyclo-siloxanes have the disadvantage that they possess a high solidifying point and high vapour pressure. When they are removed by distillation in order to improve the oil, a considerable portion of the silicone substance is lost. On the other hand, the residue condenses slowly at elevated temperatures because of its silanol groups until it becomes a very highly viscous, scarcely applicable mass. For this reason, the low-boiling portions can only be incompletely removed. The oils thereby obtained have not only an undesirably low flash-point, but due to progressive condensation even under moderate temperature conditions undergo changes which preclude their application in many fields.

It is, however, possible to produce stable silicone oils from the hydrolysis products of chlorosilane by means of the so-called "equilibration," i. e. a reaction with mono-functional silyl groups in the presence of acids. Equilibration components for admixture to provide mono-functional groups are, for example, hexamethyl-disiloxane, hexaethyl-disiloxane, ethylpentamethyl-disiloxane, 1,1,2-trimethyl-1,2,2-triethyl-disiloxane.

In the reaction of the mixture, the siloxane rings, which can be regarded as inner anhydrides of the a-ω-diols, are converted into open chains and the active hydrogen of the silanol groups is replaced by trialkylsilyl groups. Thus, oils are obtained the molecules of which consist of chains of di-organo-siloxyl groups, i. e. bi-functional members, with tri-organo-siloxyl groups, i. e. mono-functional groups, as terminal members, according to the general formula $R_3SiO(R_2SiO)_xSiR_3$, wherein R denotes an aliphatic or aromatic hydrocarbon residue. The number $x$ of the bi-functional groups defines the polymerization degree and lies between 1 and about 5000.

The siloxane mixture used for the equilibration can contain tri-functional groups besides mono-functional and bi-functional groups. Oils with an excessively high content of tri-functional groups tend to form gels.

The equilibration is mainly carried out at elevated temperatures. Water-soluble acids such as sulphuric acid or boric acid are employed as equilibration agents. Their action is explained by the assumption that the acid ruptures the silicon-oxygen linkage. One silicon atom can thereby be linked in the manner of an ester linkage to the acid radical whilst the hydrogen is linked to the oxygen of the other silicon atom to form a silanol. Either two silanols can then form a longer siloxane chain with elimination of water, or one silanol gives up its hydrogen to the acid radical to restore the acid and reacts with the silicon atom of the silyl radical linked in the manner of an ester. The elongation of the chains can proceed until a reaction with a mono-functional group takes place. At the same time, chains can be shortened by rupturing the silicon-oxygen linkage. The co-action of these acid-catalyzed reactions establishes a redistribution of the mono-functional terminal members of the chains over the available bi-functional groups and leads in this way to a statistical approximation of the various chain lengths to a mean value in the resulting random equilibrium mixture.

This value may be optionally predetermined within very wide limits by the ratio of bi-functional (and tri-functional) and mono-functional silyl groups in the total starting mixture. The properties of the siloxanes, e. g. silicone oils thus obtained, particularly their viscosity, are functions of the chain length. The signficance of the equilibrating process is therefore based on two facts, i. e. on the possibility on the one hand of increasing or reducing the polymerization degree and viscosity of silicone oils by appropriately selecting the starting mixture, and on the other hand of saturating initially available reactive components by mono-functional silyl groups. As a result, the polymerization degree attained when the equilibrium is established becomes stable.

As a pre-condition for this stability, the oil must be completely separated from the equilibrating agent, neutralized and filtered off with the addition of filtration auxiliaries after the reaction is complete. Residues of the acid would otherwise re-constitute the more readily volatile short chains at elevated temperature and thus re-introduce the disadvantages described above.

Moreover, the equilibrating process carried out industrially hitherto is cumbersome, requires corrosion-resisting vessels and involves a loss of about 10 to 15 percent of valuable silicone oil because emulsions are unavoidably formed which are lost with the aqueous portion, particularly when oils of high viscosity are produced.

The object of the present invention is to provide an improved process for the manufacture of stable poly-siloxanes by equilibration.

Further objects of the invention will become apparent as the following description proceeds.

In accordance with the present invention it has been found that stable poly-siloxanes can be obtained by an equilibrating reaction of reactive siloxanes, i. e. those containing terminal hydroxyl groups or cyclic siloxanes, with compounds containing at least one mono-functional silyl group, in the presence of a solid cation exchanger, preferably in the form of a fine dispersion, as conversion catalysts.

The hitherto unknown, completely heterogeneous catalysis of the equilibrating reaction with the aid of solid ionic exchangers has the advantage that the final product, for example an oil, has only to be mechanically separated from the exchanger after the equilibrium is established. All further working operations required by the process hitherto applied, such as separating the oil from an aqueous layer, neutralizing and drying, can be dispensed with. The walls of the reaction vessel can be made of iron. Moreover, the exchangers can be re-used several times without any regeneration.

The previously known cation exchangers which are based on carbon, synthetic resin or silicate may be used as catalysts in the herein described process. Among the cation-exchanging active carbons, particularly those containing basic groups in addition to acid groups are useful for the equilibrating process of the invention. In general, 1–3 percent of exchanger are required for carrying out the reaction. The more fine-grained the exchanger the smaller is the amount required. Adsorbed water retards the reaction and it is therefore advantageous to remove it beforehand by drying the ion exchanger. The efficiency of the ion exchanger is increased by extensively converting it into the acid form, for example, with dilute sulphuric acid and subsequent washing with water until it shows neutral reaction.

It has already been proposed in the past to use silicates in the form of bleaching earths but not for the catalysis of the equilibrium with mono-functional groups. In one case it is a question of improving the operation of the known condensation, catalysed by means of sulphuric acid or phosphoric acid, to higher-viscous oils, the acid used being adsorbed by bleaching earth. However, when applying liquid or soluble acids, even when adsorbed by bleaching earth, in the equilibration reaction, the improvement according to the present invention is not brought about because the least traces of acid, being dissolved or displaced from the carrier surface, enter the oil and lead again to the above described disadvantages. In another case, bleaching earth is used without acid-treatment in order to purify by adsorption a poly-siloxane oil from condensation catalysts which cause an increase in the viscosity even at room temperature after a prolonged period. Reactive siloxanes contained in this oil are therefore capable of condensing at elevated temperatures in the absence of a catalyst and are not changed thereby. The stability of the oil even at elevated temperature could therefore only be accomplished by effecting equilibration in known manner before treating with bleaching earth.

In contrast to this the process according to the invention as such effects an equilibration and therefore it is also possible to produce from a viscous silicone oil a thin liquid silicone oil, for example by equilibrating it with hexamethyl-disiloxane with the aid of a cation exchanger.

The process is carried out with stirring at 100–200° C. When using hexamethyl-disiloxane boiling at 100° C. as a mono-functional component, the process is effected either under reflux or in an autoclave under slightly super-atmospheric pressure. In general, the reaction proceeds for several hours. The equilibrated oil is filtered from the exchanger, which can be reused for equilibrating purposes.

The compounds obtained, particularly oils, can be used for example as heat transfer media, mold release agents, additives for polishes, anti-foaming agents or lubricants.

The following examples are given for the purpose of illustrating the invention, the viscosities mentioned being determined at 20° C.

Example 1

500 gm. of poly-dimethyl-siloxane having a viscosity of 33 centistokes and 6.5 gm. of hexamethyl-disiloxane having a viscosity of 0.7 centistoke yield a mixture having a viscosity of 32 centistokes. This is treated with 15 gm. of a very finely ground cation exchanger based on carbon (sulphonated carbon) and heated with stirring under reflux at 140° C. for 4 hours. The reaction product shows neutral reaction after filtering, and the viscosity is 360 centistokes. After reusing the filtered-off catalyst the viscosity of the oil is 416 centistokes, and after using it for a third time the viscosity is 306 centistokes.

Example 2

150 gm. of poly-dimethyl-siloxane (viscosity 31 cst.) and 2.2 gm. of hexamethyl-disiloxane (0.7 cst.; viscosity of the mixture 30 cst.) are heated with stirring under reflux with 5 gm. of a cation exchanger based on synthetic resin, previously ground and dried, at 140° C. for 4 hours. The filtered oil reacts neutral and has a viscosity of 268 centistokes.

Example 3

A mixture (32 cst.) of 500 gm. of poly-dimethyl-siloxane (33 cst.) and 6.5 gm. of hexamethyl-disiloxane are heated with stirring under reflux with 15 gm. of powdered kaolin, containing about 20 percent of muscovite, at 140° C. for 9 hours. The viscosity of the neutral oil after filtering is 354 centistokes.

Example 4

1450 gm. of octamethyl-cyclo-tetra-siloxame (2.2 cst.; B. P. 175° C.) and 1450 gm. of hexamethyl-disiloxane (0.7 cst.; B. P. 100° C.; mixture 1.5 cst.) are heated with stirring under reflux with 90 gm. of acid-activated and neutral-washed bleaching earth, containing besides montmorillonite small amounts of quartz, at 111° C. After a reaction time of 4 hours, the catalyst is filtered off and the filtrate distilled off at atmospheric pressure. Between 101° and 194° C. 950 gm. of a distillate comes over from which octamethyl-trisoloxane (B. P. 153.4° C.) can be isolated. The viscosity of the residue (2730 gm.) is 30 centistokes.

Example 5

200 gm. of poly-dimethyl-siloxane (31 cst.) and 2.7 gm. of hexamethyl-disiloxane (mixture 30 cst.) are heated with stirring under reflux with 6 gm. of medicinal charcoal, an active carbon having acid and basic groups, at 140° C. for 4 hours. An oil is obtained having a viscosity of 256 centistokes.

Example 6

500 gm. of poly-dimethyl-siloxane having a viscosity of 1440 centistokes yields with 25 gm. of hexamethyl-disiloxane a mixture having a viscosity of 975 centistokes. In order to reduce the viscosity, the mixture is heated with stirring under reflux with 15 gm. of bleaching earth of the kind described in Example 4 at 140° C. for 4 hours. The filtrate represents an oil having a viscosity of 45.5 centistokes.

We claim:

1. A process for the manufacture of stable siloxanes by reaction of a member of the group consisting of cyclic siloxanes, siloxanes containing silanol groups and mixtures of these siloxanes with compounds containing monofunctional silyl groups, which comprises carrying out the reaction in the presence of a solid cation exchanger which prior to use has been treated with acids and washed until neutral reaction is obtained.

2. A process as claimed in claim 1, wherein said cation exchanger is an artificially produced synthetic cation exchanger which is a member selected from the group consisting of cation exchange active carbon, synthetic resins and silicates.

3. A process as claimed in claim 1, wherein said cation exchanger is natural clay.

4. A process as claimed in claim 1 wherein said cation exchanger is an active carbon containing basic groups in addition to cation-exchanging acid groups.

References Cited in the file of this patent

UNITED STATES PATENTS

| | | |
|---|---|---|
| 2,460,805 | Britton | Feb. 8, 1949 |
| 2,483,158 | Sprung | Sept. 27, 1949 |
| 2,634,284 | Hyde | Apr. 7, 1953 |

FOREIGN PATENTS

| | | |
|---|---|---|
| 174,736 | Australia | Apr. 25, 1953 |

OTHER REFERENCES

"The Chemical Age," vol. 68, Apr. 11, 1953, pp. 561–564.